US006371049B1

(12) United States Patent
Boden et al.

(10) Patent No.: US 6,371,049 B1
(45) Date of Patent: Apr. 16, 2002

(54) ANIMAL LITTER

(75) Inventors: Richard M. Boden, Ocean; Guillermo H. Fernandez, Lebanon, both of NJ (US)

(73) Assignee: International Flavors & Fragrances Inc., New York, NY (US)

( * ) Notice: Subject to any disclaimer, the term of this patent is extended or adjusted under 35 U.S.C. 154(b) by 0 days.

(21) Appl. No.: 09/694,222

(22) Filed: Oct. 23, 2000

(51) Int. Cl.[7] ............................................. A01K 29/00
(52) U.S. Cl. ...................................................... 119/171
(58) Field of Search ................................. 119/171, 172, 119/173

(56) References Cited

U.S. PATENT DOCUMENTS

| 3,636,927 | A | | 1/1972 | Baum |
| 3,921,581 | A | * | 11/1975 | Brewer ........................ 119/171 |
| 4,534,891 | A | | 8/1985 | Boden et al. |
| 5,000,115 | A | | 3/1991 | Hughes |
| 5,101,771 | A | | 4/1992 | Goss |
| 5,135,743 | A | * | 8/1992 | Stanislowski et al. ...... 119/171 |
| 5,183,655 | A | * | 2/1993 | Stanislowski et al. ...... 119/171 |
| 5,193,489 | A | | 3/1993 | Hardin |
| 5,452,684 | A | | 9/1995 | Elazier-Davis et al. |
| 5,458,091 | A | | 10/1995 | Pattengill et al. |
| 5,469,809 | A | | 11/1995 | Coleman |
| 5,806,462 | A | | 9/1998 | Parr |
| 5,884,584 | A | * | 3/1999 | Feldman ...................... 119/171 |
| 5,945,333 | A | * | 8/1999 | Rehberger ................... 119/171 |
| 5,964,187 | A | * | 10/1999 | Willis .......................... 119/171 |

FOREIGN PATENT DOCUMENTS

EP          0 408 199 A1     1/1991

OTHER PUBLICATIONS (+)–Dihydromayurone from *Juniperus occidentalis*, Zhou, et al, Planta Med. 65 (1999), pp. 680–681.

* cited by examiner

*Primary Examiner*—Thomas Price
(74) *Attorney, Agent, or Firm*—Joseph F. Leightner

(57) ABSTRACT

Odor-inhibiting materials comprising litter containing an odor-inhibiting quantity of western juniper. The litter materials of the present invention are advantageous in that they can be used as animal bedding and the like to mask or prevent the formation of undesirable odors in animal laboratories, pet shops, litter boxes, kennels and the like.

10 Claims, No Drawings

ANIMAL LITTER

FIELD OF THE INVENTION

The present invention relates to novel odor inhibiting material suitable for use in animal litter and bedding.

BACKGROUND OF THE INVENTION

Fragrances and odor masking materials have been added to areas such as bedding, litter boxes and stables and other areas where animal excreta and animal odors are to be found to mask or hopefully eliminate the odors created by such excretions. The fragrances or odor maskants have been applied to materials such as clays, sawdust, litter, and wood shavings.

One of the more popular materials used for litters is cedar, because it is a natural material which means that animals typically do not have an aversion to using a bedding material or litter containing the scent. In addition, cedar has a pleasant odor and its ability to mask undesirable odors is well known. However, cedar is a desirable species and the removal of these trees to incorporate into sawdust for bedding and litter creates an undesirable environmental impact. Cedar is also commercially important wood specie and is therefore relatively expensive.

There is a continuing need to provide natural materials that provide a pleasant odor and has the ability to mask odors which also does not cause an undesirable environmental impact.

SUMMARY OF THE INVENTION

The present invention provides a composition suitable for use in an animal litter product comprising an odor-inhibiting quantity of *Juniperus occidentalis* Hook, Cupressaceae. The common name of *Juniperus occidentalis* is western juniper. The present invention also includes a method of controlling odors through the addition of western juniper to litter products and in a preferred embodiment a fragrance is imparted to the western juniper to further enhance the fragrance.

DETAILED DESCRIPTION OF THE INVENTION

The amount of western cedar added to the litter material is effective to control odors. Odor controlling material is understood to mean that undesirable odors are reduced or substantially eliminated by the inclusion of the western cedar material. The amount of western cedar included in the litter is from about 0.01 to about 10 weight percent, preferably from 0.1 to about 8, more preferably from about 0.2 to about 5 weight percent. A highly preferred level of western cedar in the litter is about 0.4 weight percent. The form of the western juniper that is added to the litter material is not critical. Suitable forms include shredded, chipped and sawdust embodiments. The preferred embodiment is the form most preferred by the animal using the litter. For example, since horses are stabled with straw, the western juniper would be incorporated in a larger size such as chips or shredded material. Since cats prefer small litter materials, it would be preferable that the western juniper be added to the litter in a smaller form, such as sawdust.

Without wishing to be bound by any theory it is believed that western juniper is effective as a odor controlling agent, because the essential oil of western juniper contains (+)-Dihydromayurone, see Zhou et al., (+)-Dihydromayurone from *Juniperus occidentalis*, Planta Medica, 65 (1999) 680–681.

In a preferred embodiment of the invention a second odor-controlling amount of fragrance is applied to the western juniper. The western juniper in addition to adding a pleasing scent, acts as a carrier for the second fragrance. The second fragrance is applied to the western juniper in any suitable manner, most commonly the second fragrance is sprayed onto the western juniper. The level of the second fragrance applied to the western juniper can vary widely. The amount of fragrance admixed to western juniper is generally from about 0.5 to about 50 of the total weight of the fragrance and western juniper admixture, preferably from about 5 to about 40 weight percent, more preferably from 20 to about 35, and in a highly preferred embodiment about 25 weight percent of the total weight of the fragrance and western juniper admixture. Those with skill in the art will also recognize that the litter material itself can also contain additional fragrant materials without departing from the scope of the present invention. One advantage of the present invention is that the inclusion of the western juniper and optional fragrance does not require the remainder of the litter or bedding material to be scented. This allows less expensive materials to be employed in the bedding materials.

The second fragrance is not limited to any specific fragrance, and the fragrance can be selected on the scent desired as well as economic factors. Many types of fragrances can be employed in the present invention, limited only by the desired scent and the suitability for use with any given animal. Suitable fragrances include but are not limited to fruits such as almond, apple, cherry, grape, pear, pineapple, orange, strawberry, raspberry, musk, flower scents such as lavender-like, rose-like, iris-like, carnation-like. Other pleasant scents include herbal and woodland scents derived from pine, spruce and other forest smells. Fragrances may also be derived from various oils, such as essential oils, or from plant materials such as peppermint, spearmint and the like. Other familiar and popular smells can also be employed, such as baby powder, popcorn, pizza, cotton candy and the like, in the present invention. Preferably the second fragrance is a woody scent which will compliment the natural fragrance of the western juniper.

A list of suitable fragrances is provided in U.S. Pat. No. 4,534,891, the contents of which are hereby incorporated by reference. Another source of suitable fragrances is found in Perfumes Cosmetics and Soaps, Second Edition, edited by W. A. Poucher, 1959. Among the fragrances provided in this treatise are acacia, cassie, chypre, cyclamen, fern, gardenia, hawthorn, heliotrope, honeysuckle, hyacinth, jasmin, lilac, lily, magnolia, mimosa, narcissus, freshly-cut hay, orange blossom, orchids, reseda, sweet pea, trefle, tuberose, vanilla, violet, wallflower, and the like.

In addition to the fragrance other agents can be used in conjunction with the fragrance. Well known materials such as surfactants, emulsifiers, polymers to encapsulate the fragrance can also be employed without departing from the scope of the present invention.

As used herein litter is understood to include any material used as bedding or waste retaining material for pets, livestock or other animals. Suitable materials include without limitation clays, wood chips, sawdust, shredded polymers such as polyurethane, polyethylene, straw, clumping materials as described in U.S. Pat. Nos. 5,806,462, 5,458,091, 5,452,684, 5,469,809, 5,193,489, 5,101,771 and 5,000,115, the patents herein incorporated by reference as set forth in their entirety. The present-invention also contemplates mixtures of the bedding or waste retaining materials in combination with the western juniper materials. The litter products of this invention can be used to inhibit, mask or eliminate animal odors found in environments such as cages, pens, enclosures, bedding, stables and areas where animals such as rats, mice, hamsters, guinea pigs, rabbits, squirrels, monkeys, horses, dogs, cats, raccoons, chickens and other birds are housed or enclosed.

One advantage of using western juniper is that it is considered a nuisance plant or a weed and it is commonly removed from areas to provide room for more desirable plants. Since it grows quickly and it is considered a weed, western juniper is inexpensive to obtain and can be easily obtained.

The compositions of the invention are relatively non-toxic to man and animals in the amounts that are added to the litter materials. In addition, *Juniperus occidentalis* has been reported to have acaricidal activity against Ixodes scapularis which has been linked to Lyme disease, see Zhou et al., (+)-Dihydromayurone from *Juniperus occidentalis*, Planta Medica, 65 (1999) 680–681. This additional biological activity is also believed to provide antibacterial properties that are also helpful in reducing undesirable odors.

These and additional modifications and improvements of the present invention may also be apparent to those with ordinary skill in the art. The particular combinations of element described and illustrated herein are intended only to represent only a certain embodiment of the present invention and is not intended to serve as limitations of alternative articles with the spirit and scope of the invention.

EXAMPLE

Various commercially available non-fragranced cat litters were purchased and three commercially available fragrances (available from International Flavors and Fragrances Inc.) were tested. The commercially available non-fragranced litters tested were TIDY CAT CRYSTALS, TIDY CAT MULTI CAT (long lasting) and TIDY CAT MULTI-CAT litters, available from the Ralston—Purina Company; FRESH STEP available from the Clorox Company and SUPER STOP available from Church & Dwight.

The three fragrances were added to the western juniper shavings at a level of 25 weight percent. The fragrance and western juniper admixture was added to the non-fragrance cat litter at a level of 0.4 weight percent. In addition, the same level of fragrance was added to the commercially available litters as was added to the western juniper.

The evaluation procedure was as follows: 50 grams of cat litter, both the commercially available unscented materials, the cat litter and the fragrance and those containing the western juniper and fragrance, were added to four ounce jars. One-half milliliter of cat urine was added to the jars and the jars were capped. Odors were allowed to accumulate in the headspace of the jars over one, two and three hours. The jars were opened and sampled for urine smell.

The samples that contained the mixture of fragrance and western juniper shavings performed much better than any of the commercially available litters, even those that contained fragrance. The litter containing the fragrance and western juniper shavings had little or no objectionable odor and in some instances a pleasant odor was still detected.

What is claimed is:

1. An animal litter product comprising a bedding material and an odor-inhibiting quantity of western juniper.

2. The animal litter product of claim 1 wherein the bedding material is selected from the group consisting of clays, wood chips, sawdust, straw, clumping materials, shredded polymers and mixtures thereof.

3. The animal litter product of claim 1 wherein the odor inhibiting quantity of western juniper is from about 0.1 to about 10 weight percent of the animal litter product.

4. The animal litter product of claim 1 wherein the odor-inhibiting quantity of western juniper additionally contains a second fragrance.

5. The animal litter product of claim 1 wherein the odor inhibiting quantity of western juniper is from about 0.2 to about 5 weight percent of the animal litter product.

6. The animal litter product of claim 1 wherein the odor inhibiting quantity of western juniper is from about 0.4 weight percent of the animal litter product.

7. The animal litter product of claim 4 wherein the second fragrance is added at a level of from about 15 to about 50 weight percent based upon the weight of the western juniper.

8. A process for inhibiting odors in animal bedding which comprises applying to the bedding material an effective amount of western juniper.

9. The process of claim 8 wherein the effective amount of western juniper is from about 0.1 to about 10 weight percent of the animal litter product.

10. The process of claim 9 wherein the second fragrance is added at a level of from about 0.1 to about 50 weight percent based upon the weight of the western juniper and second fragrance.

* * * * *